(12) United States Patent
Chan et al.

(10) Patent No.: US 11,697,568 B2
(45) Date of Patent: Jul. 11, 2023

(54) RECIPROCATING MECHANISM FOR SPINNING REEL AND SPINNING REEL HAVING THE SAME

(71) Applicant: Shimano Components (Malaysia) SDN. BHD., Johor (MY)

(72) Inventors: Yik Hui Chan, Johor (MY); Md Shahid Bin Sowarni, Johor (MY)

(73) Assignee: Shimano Components (Malaysia) SDN. BHD., Pontian (MY)

( * ) Notice: Subject to any disclaimer, the term of this patent is extended or adjusted under 35 U.S.C. 154(b) by 0 days.

(21) Appl. No.: 17/510,604

(22) Filed: Oct. 26, 2021

(65) Prior Publication Data

US 2022/0204308 A1 Jun. 30, 2022

(30) Foreign Application Priority Data

Dec. 24, 2020 (JP) .............................. JP2020-215828

(51) Int. Cl.
*A01K 89/01* (2006.01)
*B65H 54/28* (2006.01)
*A01K 89/00* (2006.01)
*A01K 89/015* (2006.01)

(52) U.S. Cl.
CPC ....... *B65H 54/2812* (2013.01); *A01K 89/006* (2013.01); *A01K 89/0183* (2015.05); *B65H 2701/355* (2013.01)

(58) Field of Classification Search
CPC .......... B65H 54/2812; B65H 2701/355; A01K 89/01141; A01K 89/01142
See application file for complete search history.

(56) References Cited

U.S. PATENT DOCUMENTS

| | | | | |
|---|---|---|---|---|
| 6,000,653 A | * | 12/1999 | Okada | A01K 89/0114 242/242 |
| 6,082,650 A | * | 7/2000 | Okada | A01K 89/0114 242/242 |
| 2018/0146653 A1 | * | 5/2018 | Saito | A01K 89/01143 |
| 2019/0327948 A1 | * | 10/2019 | Chan | A01K 89/0186 |

FOREIGN PATENT DOCUMENTS

| | | | | |
|---|---|---|---|---|
| EP | 1508274 A1 | * | 2/2005 | ......... A01K 89/0114 |
| EP | 3097781 A1 | * | 11/2016 | ......... A01K 89/0114 |
| EP | 3326459 A1 | * | 5/2018 | ......... A01K 89/0102 |
| JP | 2004-065119 A | | 3/2004 | |

* cited by examiner

*Primary Examiner* — Emmanuel M Marcelo
(74) *Attorney, Agent, or Firm* — United IP Counselors, LLC

(57) ABSTRACT

A reciprocating mechanism for a spinning reel includes a first gear, a second gear, a slider, and an annular elastic body. The first gear is configured to rotate in accordance with rotation of a handle shaft. The second gear includes a gear body configured to mesh with the first gear and a boss protruding from the gear body. The slider has an engagement groove where the boss engages. The slider is configured to move a spool shaft in a front-rear direction as the boss moves along the engagement groove. The annular elastic body is attached to the boss so as to contact an open end of the engagement groove.

9 Claims, 5 Drawing Sheets

RECIPROCATING MECHANISM FOR SPINNING REEL AND SPINNING REEL HAVING THE SAME

CROSS-REFERENCE TO RELATED APPLICATIONS

This application claims priority to Japanese Patent Application No. 2020-215828, filed Dec. 24, 2020. The contents of that application are incorporated by reference herein in their entirety.

TECHNICAL FIELD

The present invention relates to a reciprocating mechanism for a spinning reel, and a spinning reel having the reciprocating mechanism.

BACKGROUND ART

Spinning reels have been conventionally disclosed that include a reciprocating mechanism. The reciprocating mechanism includes a sliding gear that rotates in accordance with the rotation of a handle shaft and a cam gear that meshes with the sliding gear. The cam gear includes a gear body configured to mesh with the sliding gear, and a boss protruding from the gear body. The boss engages with an engagement groove of a slider. As the boss moves along the engagement groove, the slider moves the spool shaft in the front-rear direction.

In the conventional reciprocating mechanisms, in order to move the boss of the cam gear along the engagement groove of the slider, a clearance is provided between the outer peripheral surface of the boss and a wall surface of the engagement groove. Due to this clearance, when the boss moves along the engagement groove, the outer peripheral surface of the boss may collide with the wall surfaces of the engagement groove, which can cause a collision noise.

In the spinning reel of Japanese Unexamined Patent Application Publication No. 2004-065119, an annular elastic body is interposed between the boss and the engagement groove to reduce the collision.

In the reciprocating mechanism of Japanese Unexamined Patent Application Publication No. 2004-065119, the annular elastic body receives a load during the movement, and slides in contact with the boss while being deformed. Thus, the durability of the annular elastic body is an issue. In particular, when the annular elastic body is held in an annular holding groove in the boss, the annular elastic body is in sliding contact with the engagement groove while the degree of deformation of the annular elastic body is limited by the annular holding groove. Accordingly, the surface of the annular elastic body is likely to be damaged.

BRIEF SUMMARY

The present invention has been made in view of the above circumstances, and an object of the present invention is to improve the durability of an annular elastic body in a reciprocating mechanism for a spinning reel in which collision between a boss of a second gear and an engagement groove of a slider can be reduced.

A reciprocating mechanism for a spinning reel according to one aspect of the present invention includes a first gear, a second gear, a slider, and an annular elastic body. The first gear rotates in accordance with the rotation of a handle shaft. The second gear includes a gear body configured to mesh with the first gear, and a boss protruding from the gear body. The slider has an engagement groove where the boss engages. The slider moves a spool shaft in a front-rear direction as the boss moves along the engagement groove. The annular elastic body is attached to the boss so as to contact an open end of the engagement groove.

In the reciprocating mechanism of the present invention, the boss moves along the engagement groove in a state where the annular elastic body attached to the boss of the second gear is in contact with the open end of the engagement groove of the slider. With this configuration, the collision between the boss of the second gear and the engagement groove of the slider can be reduced. In addition, since the boss bears the load, the durability of the annular elastic body can be improved.

In a reciprocating mechanism for a spinning reel according to another aspect of the present invention, it is preferable that the annular elastic body is interposed between the open end of the engagement groove and the gear body.

In this case, the annular elastic body contacts an outer peripheral surface of the boss, the gear body, and the open end of the engagement groove. When the boss moves along the engagement groove in this state, the annular elastic body is compressed by the open end of the engagement groove while being supported by the outer peripheral surface of the boss and the gear body. As a result, the annular elastic body can be stably compressed.

In a reciprocating mechanism for a spinning reel according to another aspect of the present invention, it is preferable that the open end of the engagement groove has a maximum distance in the front-rear direction, the maximum distance being larger than the distance between wall surfaces of the engagement groove in the front-rear direction at where the tip of the boss is positioned in the engagement groove. In this case, since the maximum distance of the open end of the engagement groove is larger than the distance between wall surfaces of the engagement groove, the annular elastic body can be preferably brought into contact with the open end of the engagement groove.

In a reciprocating mechanism for a spinning reel according to another aspect of the present invention, it is preferable that the engagement groove includes an engagement recess portion where the tip of the boss is positioned, and a wide portion wider in width than the engagement recess portion so that the annular elastic body contacts the wide portion. In this case, the wide portion of the engagement groove enables the annular elastic body to preferably contact the open end of the engagement groove.

In a reciprocating mechanism for a spinning reel according to another aspect of the present invention, it is preferable that the boss is columnar or truncated cone in shape. As a result, the boss can smoothly move inside the engagement groove.

A spinning reel according to one aspect of the present invention includes a reel body, a handle shaft rotatably supported by the reel body, a spool shaft supported movably with respect to the reel body in the front-rear direction, and the above-described reciprocating mechanism. The reciprocating mechanism moves the spool shaft in accordance with rotation of the handle shaft in the front-rear direction. The spinning reel of the present invention is configured to obtain the same effect as the reciprocating mechanism described above.

In the present invention, in a reciprocating mechanism for a spinning reel and in a spinning reel having the reciprocating mechanism, while the collision between the boss of the second gear and the engagement groove of the slider is reduced, the durability of the annular elastic body interposed between them can be improved.

DETAILED DESCRIPTION

Figure 1:
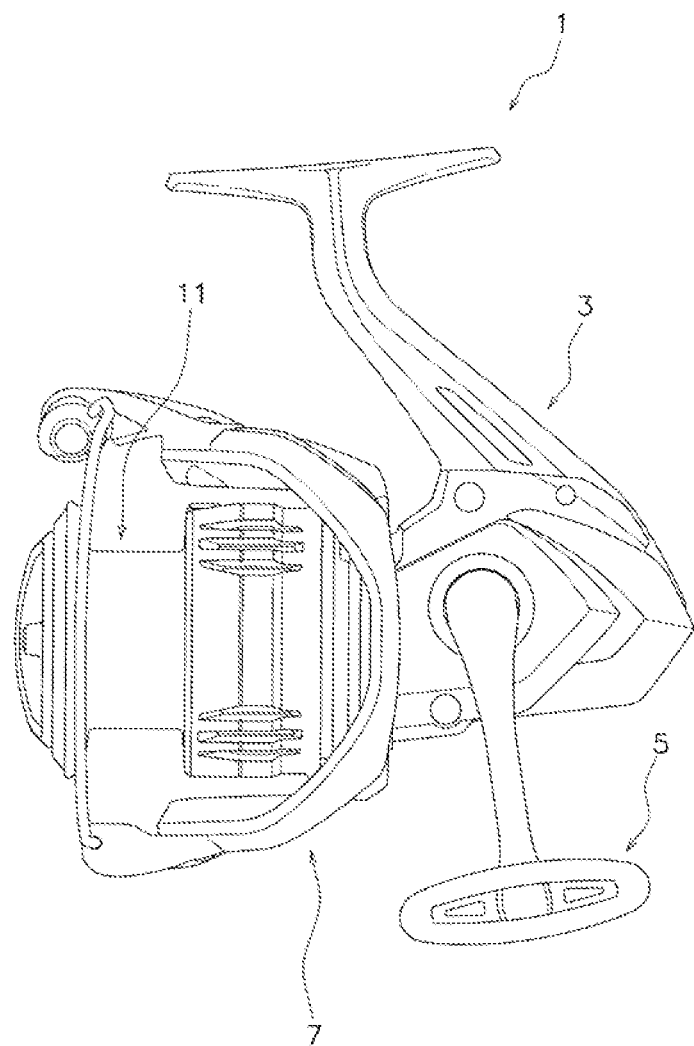
FIG. 1 is a side view of a spinning reel according to an embodiment of the present invention.
Figure 2:
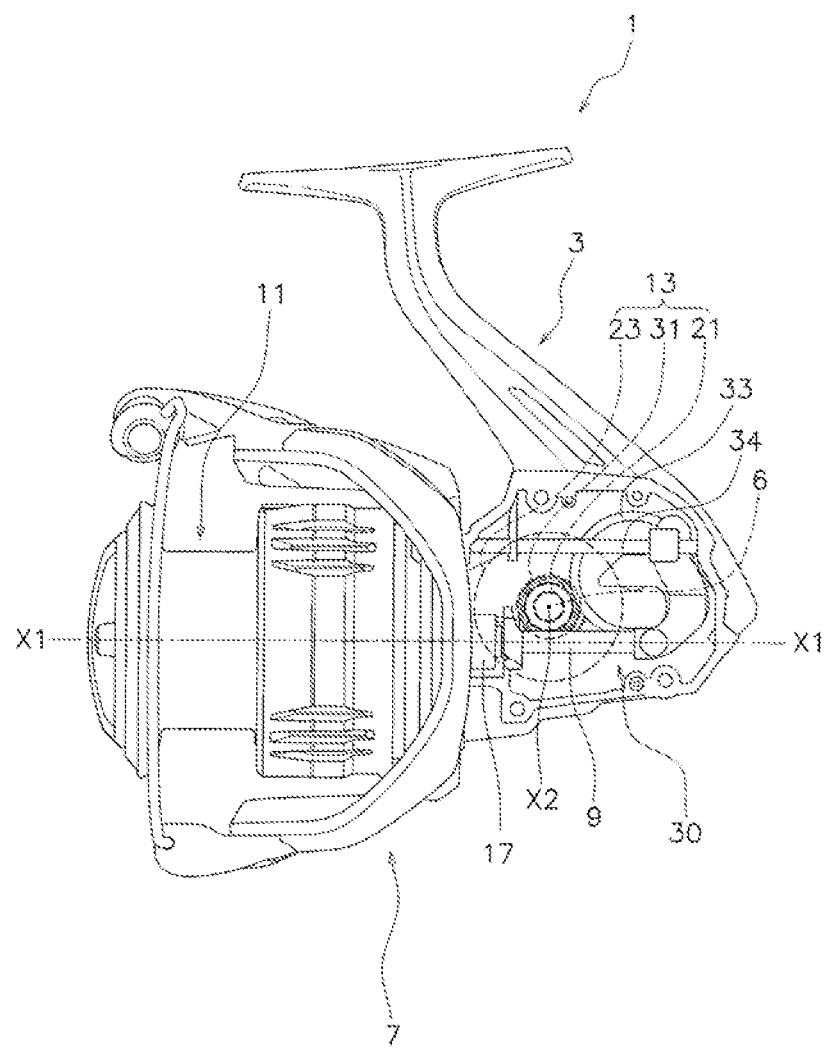
FIG. 2 is a side view with a side cover and a drive body removed from the spinning reel.

As shown in FIG. 1, a spinning reel 1 using one embodiment of the present invention includes a reel body 3, a handle 5, a rotor 7, a spool 11, a drive body 13 (see FIG. 2), and an oscillating mechanism 30 (see FIG. 2).

As shown in FIG. 1, the handle 5 is rotatably supported by the reel body 3. In the present embodiment, an example is illustrated in which the handle 5 is disposed on the left side of the reel body 3, but the handle 5 may be disposed on the right side of the reel body 3. As shown in FIG. 2, the oscillating mechanism 30 is arranged in the internal space of the reel body 3 for moving the spool 11 in a front-rear direction.

The rotor 7 is used to wind a fishing line around the spool 11. As shown in FIGS. 1 and 2, the rotor 7 is disposed on the front of the reel body 3. The rotor 7 is configured to be rotatable with respect to the reel body 3. For example, as shown in FIG. 2, the rotor 7 is connected to a pinion gear 17 to be rotatable together. The pinion gear 17 is rotatably supported by the reel body 3. The rotor 7 rotates in accordance with the rotation of the pinion gear 17.

A fishing line is wound around the spool 11. The spool 11 is configured to be movable integrally with a spool shaft 9. For example, the spool 11 is attached to the tip of the spool shaft 9. As shown in FIG. 2, the spool shaft 9 is configured to be reciprocally movable with respect to the reel body 3. For example, the spool shaft 9 is supported so as to be movable in the front-rear direction with respect to the reel body 3. Specifically, the spool shaft 9 is inserted into the inner peripheral portion of the tubular pinion gear 17. The spool shaft 9 reciprocates in the front-rear direction with respect to the reel body 3 by the operation of the oscillating mechanism 30. The front-rear direction is a direction in which a spool axis X1 of the spool shaft 9 extends.

As shown in FIG. 2, the drive body 13 includes a drive shaft 21, a drive gear 23, and a sliding gear 31 (an example of the first gear). The drive shaft 21 rotates in accordance with the rotation of the handle 5. For example, the drive shaft 21 is equipped with a handle shaft 6 of the handle 5.

The drive shaft 21 has a drive axis X2. For example, the drive shaft 21 is cylindrical in shape. The handle shaft 6 is detachably attached in the inner peripheral portion of the drive shaft 21. The handle shaft 6 is rotatably supported by the reel body 3.

The drive gear 23 is used to rotate the rotor 7. The drive gear 23 is mounted on the drive shaft 21. The drive gear 23 meshes with the pinion gear 17. The sliding gear 31 is used to move the spool shaft 9. The sliding gear 31 is mounted on the drive shaft 21 and spaced apart from the drive gear 23. The spool shaft 9 and a guide shaft 34 described later are arranged between the drive gear 23 and the sliding gear 31. The sliding gear 31 meshes with a cam gear 33 (an example of the second gear) described later.

The drive gear 23 and the sliding gear 31 rotate in accordance with the rotation of the handle 5 (handle shaft 6). Rotation of the drive gear 23 and the sliding gear 31 causes the pinion gear 17 and the cam gear 33 to rotate.

Figure 3:
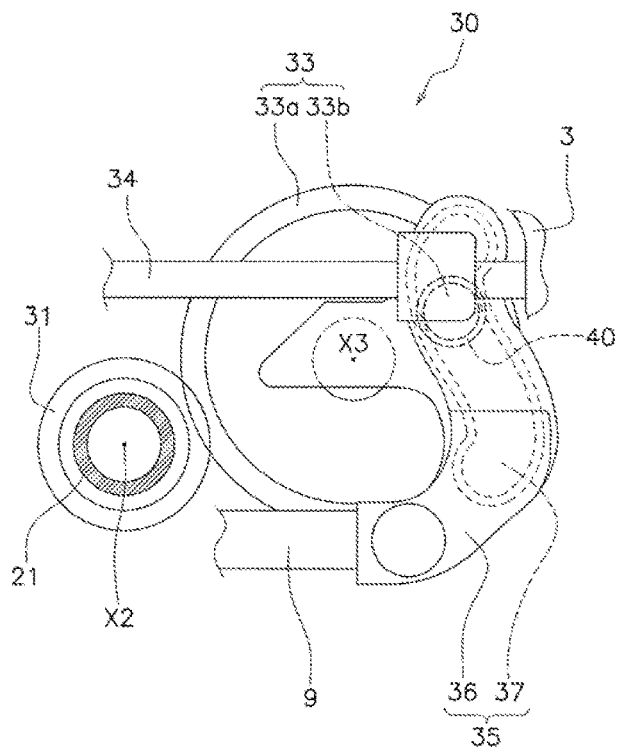
FIG. 3 is a partially enlarged side view of an oscillating mechanism.

The oscillating mechanism 30 moves the spool shaft 9 in the front-rear direction in accordance with the rotation of the handle shaft 6. As shown in FIG. 3, the oscillating mechanism 30 includes the sliding gear 31, the cam gear 33, the guide shaft 34, a slider 35, and an O-ring 40 (an example of the annular elastic body). In FIG. 3, a tooth portion of the sliding gear 31 and a tooth portion of the cam gear 33 are illustrated as simplified.

The sliding gear 31 constitutes the drive body 13 as described above. The cam gear 33 is used to move the slider 35 in the front-rear direction. The cam gear 33 includes a gear body 33a and a boss 33b. The gear body 33a is supported by the reel body 3 rotatably around an axis X3 that is parallel to the drive axis X2. The gear body 33a meshes with the sliding gear 31.

The boss 33b protrudes from the gear body 33a. For example, the boss 33b protrudes from the gear body 33a in a direction in which the drive axis X2 extends. The boss 33b engages with an engagement groove 37 of the slider 35, which will be described later.

The boss 33b moves along the engagement groove 37 in accordance with the rotation of the gear body 33a while being positioned inside the engagement groove 37. The boss 33b is columnar in shape. In the present embodiment, the boss 33b is columnar as an example, but the boss 33b may be in a truncated cone shape.

The guide shaft 34 is used to guide the slider 35 in the front-rear direction. The guide shaft 34 is disposed above the spool shaft 9. The guide shaft 34 is arranged parallel to the spool shaft 9 (the spool axis X1) and is fixed to the reel body 3.

The slider 35 is used to move the spool shaft in the front-back direction. The slider 35 includes a slider body 36 and the engagement groove 37. The slider body 36 is fixed to the rear end of the spool shaft 9. The guide shaft 34 is inserted into the slider body 36. The slider body 36 moves along the guide shaft 34 in the front-rear direction.

The engagement groove 37 is disposed in the slider body 36. The boss 33b is positioned in the engagement groove 37. For example, in a state where the slider body 36 is attached to the spool shaft 9 and the guide shaft 34, the engagement groove 37 extends upward from the spool shaft 9. The engagement groove 37 is curved in shape when viewed from the handle 5 side (as shown in FIG. 3) in the drive axis X2 direction of the drive shaft.

Figure 4A:
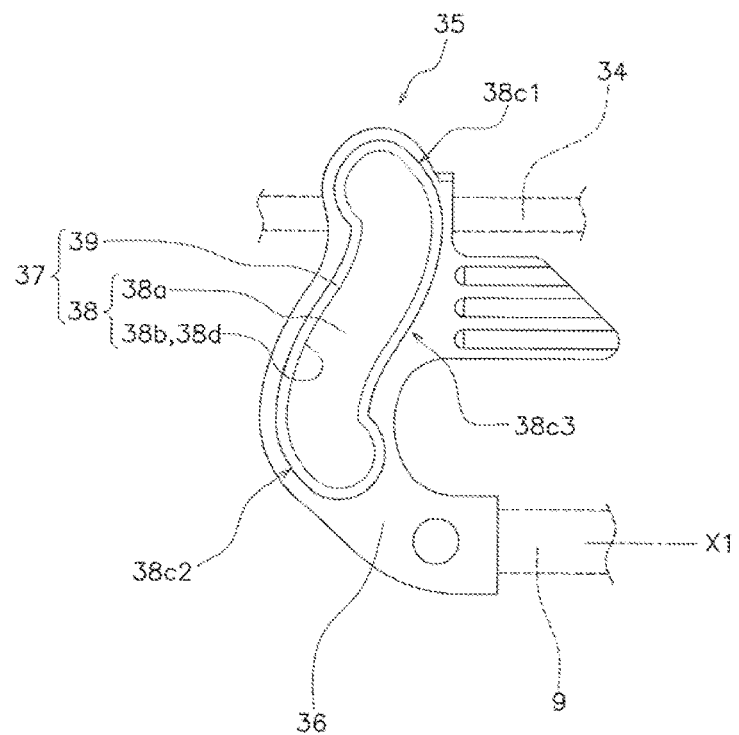
FIG. 4A is a side view of a slider.

As shown in FIG. 4A, the engagement groove 37 includes an engagement recess portion 38 and a wide portion 39 (an example of the open end of the engagement groove). The tip and middle portions of the boss 33b are positioned in the engaging recess portion 38. The engagement recess portion 38 has an inverted S shape when the engagement groove 37 is viewed from outside in the drive shaft direction.

The engagement recess portion 38 is defined by a bottom surface 38a and wall surfaces 38b surrounding the bottom surface 38a. The engagement recess portion 38 has a first end 38c1, a second end 38c2, and a middle portion 38c3 between the first end 38c1 and the second end 38c2. At the first end 38c1 and the second end 38c2, the wall surfaces 38b surrounds the bottom 38a. At the middle portion 38c3, a pair of wall surfaces 38b are arranged to face each other.

The wide portion 39 constitutes the open end of the engagement groove 37. The base end portion of the boss 33b is positioned in the wide portion 39. The O-ring 40 contacts the wide portion 39. The wide portion 39 is wider than the engagement recess portion 38. In the present embodiment, the wide portion 39 is an inclined surface extending outward from the boundary 38d of the engagement recess portion 38 (see FIG. 5). Further, the wide portion 39 is an inclined surface surrounding the boundary 38d of the engagement g recess portion 38 (see FIG. 4A).

Figure 4B:
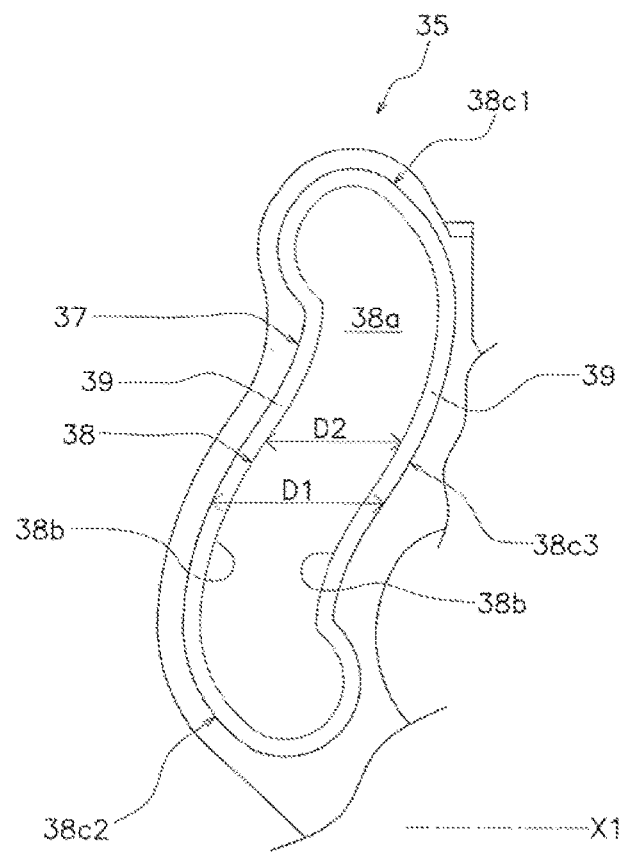
FIG. 4B is a partially enlarged side view of the slider.

For example, as shown in FIG. 4B, a maximum spacing D1 of the wide portion 39 in the front-rear direction (an example of the "maximum distance of the open end of the engagement groove in the front-rear direction") is larger than a spacing between wall surfaces D2 of the engagement recess portion 38 in the front-rear direction (an example of the "distance between wall surfaces, in the front-rear direction, at the part of the engagement groove where the tip of the boss is positioned").

Here, the maximum spacing D1 and the spacing between wall surfaces D2 are defined on a plane orthogonal to the bottom surface 38a and parallel to the spool axis X1. The plane preferably crosses the middle portion 38c3 of the engagement groove 37.

The maximum spacing D1 is measured at the part of the cam gear 33 closest to the gear body 33a on the wide portion 39 (the inclined surface). The spacing between wall surfaces D2 is measured at a pair of the wall surfaces 38b facing each other in the engaging recess portion 38. The spacing between wall surfaces D2 may be interpreted as the maximum wall spacing in the engaging recess portion 38.

Figure 5:
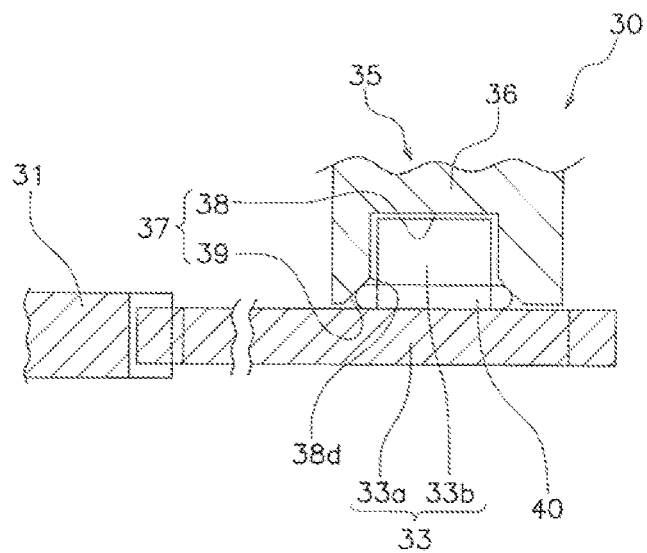
FIG. 5 is a partially enlarged cross-sectional view of the oscillating mechanism.

The O-ring 40 is used to reduce the collision between the boss 33b and the engagement groove 37. As shown in FIG. 5, the O-ring 40 is attached to the boss 33b. For example, the O-ring 40 is attached to the base end portion of the boss 33b. With this configuration, the O-ring 40 contacts the wide portion 39 of the engagement groove 37.

Note that FIG. 5 is a cross-sectional view of the sliding gear 31, the cam gear 33, and the slider 35 that are cut along a plane crossing the drive axis X2 of the drive shaft 21 and the axis X3 of the cam gear 33. The cross-sectional view of FIG. 5 schematically shows these elements to facilitate explanation.

Specifically, as shown in FIG. 5, the O-ring 40 is mounted on the outer peripheral surface of the boss 33b at the base end portion of the boss 33b. With this configuration, the O-ring 40 contacts the gear body 33a and the wide portion 39 (the inclined surface) of the engagement groove 37. Accordingly, the O-ring 40 contacts the wide portion 39 (the inclined surface) of the engagement groove 37 while being in contact with the gear body 33a and the boss 33b. In this way, the O-ring 40 is positioned between the gear body 33a and boss 33b, and the wide portion 39 (the inclined surface) of the engagement groove 37.

In the oscillating mechanism 30, when the sliding gear 31 rotates in accordance with the rotation of the handle shaft 6, the cam gear 33 rotates. The rotation of the cam gear 33 causes the boss 33b of the cam gear 33 to move along the engagement recess portion 38 of the slider 35. With the movement, the O-ring 40 slides with the wide portion 39 of the slider 35 while being in contact with the wide portion 39 of the slider 35. As the oscillating mechanism 30 operates in this way, the slider 35 moves the spool shaft 9 in the front-rear direction while being guided by the guide shaft 34.

The spinning reel 1 described above has the following features.

In the oscillating mechanism 30 of the spinning reel 1, the boss 33b moves along the engagement groove 37 (the engagement recess portion 38) in a state where the O-ring 40 mounted on the boss 33b of the cam gear 33 is in contact with the wide portion 39 of the engagement groove 37 in the slider 35. With this configuration, the collision between the boss 33b of the cam gear 33 and the engagement groove 37 of the slider 35 can be reduced.

Further, in the oscillating mechanism 30 of the spinning reel 1, the O-ring 40 contacts the outer peripheral surface of the boss 33b, the gear body 33a, and the wide portion 39 of the engagement groove 37. In this state, when the boss 33b moves along the engagement groove 37 (the engagement recess portion 38), the O-ring 40 is compressed by the wide portion 39 of the engagement groove 37 while being supported by the outer peripheral surface of the boss 33b and the gear body 33a. As a result, the O-ring 40 can be stably compressed.

Further, in the oscillating mechanism 30 of the spinning reel 1, the maximum spacing D1 in the wide portion 39 in the front-rear direction is larger than the spacing between wall surfaces D2 of the engaging recess portion 38 in the front-rear direction. Thus, the O-ring 40 can be preferably in contact with the wide portion 39 of the engagement groove 37.

Further, in the oscillating mechanism 30 of the spinning reel 1, since the engagement groove 37 has the wide portion 39, the O-ring 40 can be preferably brought into contact with the wide portion 39 of the engagement groove 37.

Furthermore, in the oscillating mechanism 30 of the spinning reel 1, since the boss 33b is in a columnar or truncated cone shape, the boss 33b can smoothly move inside the engagement groove 37.

Other Embodiments

Figure 6:
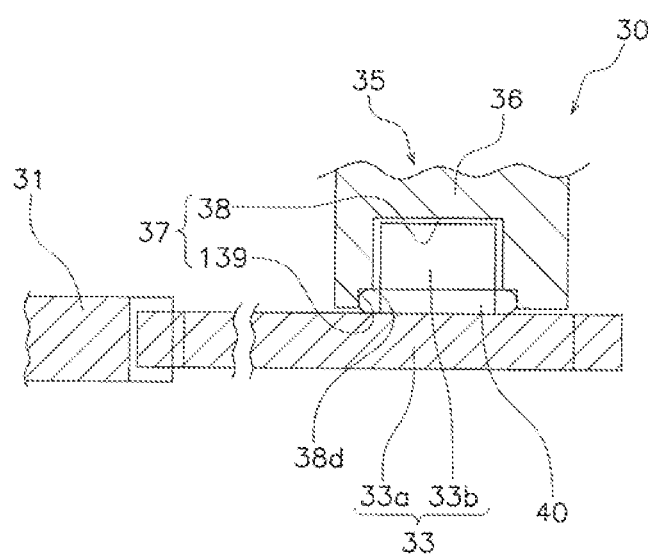
FIG. 6 is a partially enlarged cross-sectional view of an oscillating mechanism according to another embodiment of the present invention.

In the above embodiment, an example is shown in which the wide portion 39 of the engagement groove 37 is an inclined surface. Instead, as shown in FIG. 6, a wide portion 139 of the engagement groove 37 may be a stepped portion. In FIG. 6, the same reference numerals are given to the same configurations as those in the above embodiment. The configurations of the same reference numerals will be in accordance with the description of the above-described embodiment.

As shown in FIG. 6, the wide portion 139 (the step portion) surrounds the boundary 38d of the engaging recess portion 38. The O-ring 40 contacts the wide portion 139 (the step portion). With such a configuration, the same effect as that of the above-described embodiment can be obtained.

The present invention is applicable to reciprocating mechanisms in spinning reels.

REFERENCE SIGNS LIST

1 Spinning reel
3 Reel body
7 Rotor
9 Spool shaft
13 Drive body
21 Drive shaft
23 Drive gear
31 Sliding gear
33 Cam gear
33a Gear body 33b Boss
35 Slider
37 Engagement groove
38 Engagement recess
39 Wide portion
O-ring
D1 Maximum spacing
D2 Spacing between wall surfaces

What is claimed is:

1. A reciprocating mechanism for a spinning reel, comprising:
   a first gear configured to rotate in accordance with rotation of a handle shaft;
   a second gear including a gear body configured to mesh with the first gear and a boss protruding from the gear body;
   a slider having an engagement groove where the boss engages, the slider configured to move a spool shaft in a front-rear direction as the boss moves along the engagement groove; and
   an annular elastic body attached to the boss so as to contact an open end of the engagement groove, the open end of the engagement groove having a maximum distance in the front-rear direction, the maximum distance being larger than a distance between wall surfaces of the engagement groove in the front-rear direction at where a tip of the boss is positioned in the engagement groove.

2. The reciprocating mechanism for a spinning reel according to claim 1, wherein
   the annular elastic body is interposed between the open end of the engagement groove and the gear body.

3. The reciprocating mechanism for a spinning reel according to claim 1, wherein
   the engagement groove includes an engagement recess portion where a tip of the boss is positioned, and a wide portion wider than the engagement recess portion, the annular elastic body contacting the wide portion.

4. The reciprocating mechanism for a spinning reel according to claim 3, wherein
   the wide portion is an inclined surface.

5. The reciprocating mechanism for a spinning reel according to claim 3, wherein
   the wide portion is a stepped portion.

6. The reciprocating mechanism for a spinning reel according to claim 3, wherein
   during movement of the boss along the engagement groove, the annular elastic body is compressed by the wide portion of the engagement groove while being supported by the boss and the gear body.

7. The reciprocating mechanism for a spinning reel according to claim 1, wherein
   the boss is columnar or truncated cone in shape.

8. The reciprocating mechanism for a spinning reel according to claim 1, wherein
   the engagement groove has a curved shape.

9. A spinning reel comprising:
   a reel body;
   a handle shaft rotatably supported by the reel body;
   a spool shaft supported movably with respect to the reel body in a front-rear direction; and
   a reciprocating mechanism according to claim 1, the reciprocating mechanism configured to move the spool shaft in accordance with rotation of the handle shaft in the front-rear direction.

* * * * *